(12) United States Patent
Afriat et al.

(10) Patent No.: US 8,989,588 B2
(45) Date of Patent: Mar. 24, 2015

(54) OPTICAL TRANSCEIVER WITH EQUALIZATION AND CONTROLLABLE LASER INTERCONNECTION INTERFACE

(71) Applicants: Gil Afriat, Givat Ada (IL); Lior Horwitz, Nirit (IL); Dror Lazar, Kiryat Bialik (IL); Assaf Issachar, Kfar-Yona (IL); Alexander Pogrebinsky, Yokneam Elit (IL); Adee O. Ran, Maayan Baruch (IL); Ehud Shoor, Haifa (IL); Roi Bar, Beit-Herut (IL); Rushdy A. Saba, Haifa (IL)

(72) Inventors: Gil Afriat, Givat Ada (IL); Lior Horwitz, Nirit (IL); Dror Lazar, Kiryat Bialik (IL); Assaf Issachar, Kfar-Yona (IL); Alexander Pogrebinsky, Yokneam Elit (IL); Adee O. Ran, Maayan Baruch (IL); Ehud Shoor, Haifa (IL); Roi Bar, Beit-Herut (IL); Rushdy A. Saba, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/747,310

(22) Filed: Jan. 22, 2013

(65) Prior Publication Data

US 2013/0188965 A1 Jul. 25, 2013

Related U.S. Application Data

(60) Provisional application No. 61/589,717, filed on Jan. 23, 2012, provisional application No. 61/590,172, filed on Jan. 24, 2012.

(51) Int. Cl.
*H04B 10/00* (2013.01)
*H04B 10/69* (2013.01)
(Continued)

(52) U.S. Cl.
CPC ............... *H04B 10/69* (2013.01); *H04B 10/60* (2013.01); *H01R 13/518* (2013.01)
USPC ........... 398/136; 398/135; 398/138; 398/139; 398/159; 398/158; 398/182; 398/183; 398/192; 398/193; 398/194; 375/232; 375/233; 375/229; 375/219

(58) Field of Classification Search
CPC ........ H04B 10/40; H04B 10/60; H04B 10/66; H04B 10/58; H04B 10/69; H04B 10/691; H04B 10/697; H04B 10/6971; H04B 10/50; H04B 10/504
USPC ......... 398/135, 136, 137, 138, 139, 182, 192, 398/193, 194, 183, 202, 208, 209, 210, 214, 398/158, 159, 164; 375/232, 233, 229, 219, 375/224
See application file for complete search history.

(56) References Cited

U.S. PATENT DOCUMENTS 5,010,588 A 4/1991 Gimlett
6,353,366 B1 3/2002 Chan et al.
(Continued)

FOREIGN PATENT DOCUMENTS

KR 10-0825741 B1 4/2008

OTHER PUBLICATIONS

Kim et al., "Surface Mountable 10 Gbps Photoreceiver Module Using Inductive Compensation Method", Feb. 2004, ETRI Journal, vol. 26 No. 1, pp. 57-60.
(Continued)

*Primary Examiner* — Hanh Phan
(74) *Attorney, Agent, or Firm* — Blakely, Sokoloff, Taylor & Zafman LLP

(57) ABSTRACT

An optical transceiver includes an optical IC coupled to a processor IC. For transmit, the optical IC can be understood as a transmitter IC including a laser device or array. For receive, the optical IC can be understood as a receiver IC including a photodetector/photodiode device or array. For a transmitter IC, the processor IC includes a driver for a laser of the transmitter IC. The driver includes an equalizer that applies high frequency gain to a signal transmitted with the laser device. For a receiver IC, the processor IC includes a front end circuit to interface with a photodetector of the receiver IC. The front end circuit includes an equalizer that applies high frequency gain to a signal received by the receiver IC. The driver can be configurable to receive a laser having either orientation: ground termination or supply termination.

19 Claims, 11 Drawing Sheets

(51) Int. Cl.
*H04B 10/60* (2013.01)
*H01R 13/518* (2006.01)

(56) References Cited

U.S. PATENT DOCUMENTS

| | | | | |
|---|---|---|---|---|
| 7,317,769 | B2* | 1/2008 | Tonietto et al. | 375/340 |
| 7,715,669 | B2* | 5/2010 | Cunningham et al. | 385/24 |
| 8,041,226 | B2* | 10/2011 | Kato | 398/136 |
| 2006/0198571 | A1 | 9/2006 | Allouche | |
| 2006/0216032 | A1 | 9/2006 | Millard | |
| 2008/0044141 | A1 | 2/2008 | Willis et al. | |
| 2008/0107423 | A1* | 5/2008 | Lee et al. | 398/136 |
| 2008/0145060 | A1 | 6/2008 | Nelson et al. | |
| 2008/0193140 | A1 | 8/2008 | Liu et al. | |
| 2008/0267633 | A1 | 10/2008 | Weem et al. | |
| 2009/0047027 | A1 | 2/2009 | Liu et al. | |
| 2010/0095110 | A1 | 4/2010 | Noble et al. | |
| 2010/0194617 | A1 | 8/2010 | Oku | |
| 2010/0254713 | A1* | 10/2010 | Tanaka | 398/182 |
| 2012/0007689 | A1 | 1/2012 | Zhang | |

OTHER PUBLICATIONS

Montgomery et al., "A 28 GHZ transimpedance preamplifier with inductive bandwidth enhancement", Dec. 1993, IEEE, pp. 423-426.
PCT Written Opinion, PCT/US2013/022594, mailed May 15, 2013, 4 pages.
PCT International Preliminary Report on Patentability, PCT/US2013/022594, mailed Jul. 29, 2014, 5 pages.
International Search Report, PCT/US2013/022594, Mailed May 15, 2013, 2 pages.

\* cited by examiner

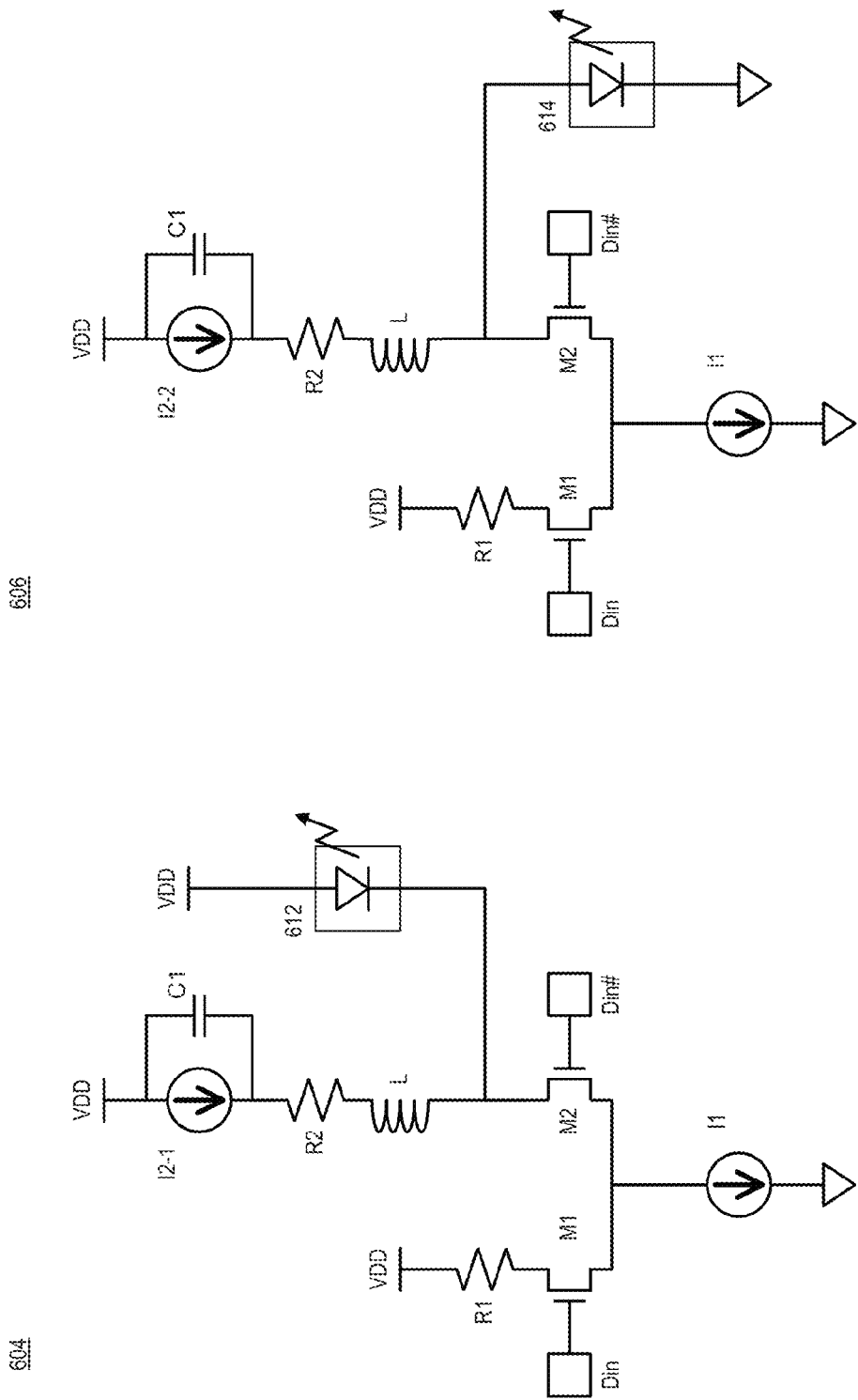

OPTICAL TRANSCEIVER WITH EQUALIZATION AND CONTROLLABLE LASER INTERCONNECTION INTERFACE

RELATED APPLICATIONS

This patent application is a non-provisional utility application based on, and claims the benefit of priority of, U.S. Provisional Application No. 61/589,717, filed Jan. 23, 2012, and U.S. Provisional Application No. 61/590,172, filed Jan. 24, 2012.

This patent application is related to U.S. patent application Ser. No. 13/730,452, filed Dec. 28, 2012.

FIELD

Embodiments of the invention are generally related to optical interconnections, and more particularly to applying equalization to optical transceiver systems.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2013, Intel Corporation, All Rights Reserved.

BACKGROUND

The rising demand for computing and multimedia devices has increased demand for interconnecting devices. The interconnection of computing devices to each other, and peripherals to computing devices continues to raise the demand for faster (e.g., higher bandwidth) data communication links. The currently desired bandwidths cannot be delivered reliably by electrical interconnections over the distances required for modern electronic equipment.

Optical channel solutions have the potential to provide longer range and higher speed capabilities. However, optical channel solutions for removable interconnections with modern electronics have practical considerations that are different from previous uses of optical communications solutions. Optical devices that provide the bandwidths desired (currently on the order of 25 Gb/s per channel) are typically of a physical size that introduces challenges for automatic alignment.

Specifically referring to the receiver side, higher speed, small photodetectors are small enough that the active area to focus on requires a level of precision that is difficult to achieve with traditional manufacturing equipment. Thus, theoretical designs may not be amenable to high volume manufacturing (HVM). The designed device characteristics may be unavailable in a device compatible with manufacturability constraints of high volume equipment and processes.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 6A-6D are block diagrams of embodiments of a transmitter that can receive either a voltage source terminated or a ground terminated laser device.

Figure 1:
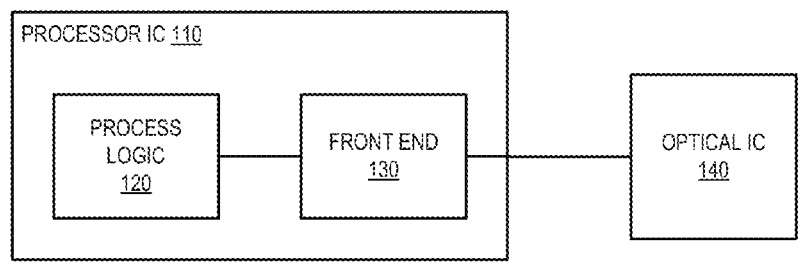
FIG. 1 is a block diagram of an embodiment of an optical transceiver with a front end circuit integrated onto a processor IC.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, an optical transceiver includes an optical IC coupled to a processor IC. For transmit, the optical IC can be understood as a transmitter IC including a laser device or array. For receive, the optical IC can be understood as a receiver IC including a photodetector/photodiode device or array. The processor IC includes a driver circuit to interface with a transmitter IC. In one embodiment, the driver circuit includes an equalizer that applies high frequency gain to a signal to be transmitted with a laser of the transmitter IC. The processor IC includes a front end circuit to interface with a photodetector of a receiver IC. In one embodiment, the front end circuit includes an equalizer that applies high frequency gain to a signal received by the receiver IC. In one embodiment, the driver circuit can be configurable to receive a laser having an orientation of either ground termination or supply termination.

With increased bandwidth requirements for transmitters and receivers in current systems, faster photodetectors and laser devices are traditionally used to achieve the desired bit rate for the optical communication. As a rule of thumb, the receiver bandwidth is typically designed to be at least 0.6 times the bit rate. Lower receiver bandwidth tends to introduce inter symbol interference (ISI) effects. However, faster photodetectors are generally smaller in form factor, which reduces the parasitic capacitance that limits bandwidth. Thus, faster photodetectors are smaller and create alignment issues with respect to aligning to the optical fiber in high volume production. Thus, there is an apparent conflict in that a photodetector that is fast enough to meet optical communication bit rate requirements is small enough to not be manufacturable by automated methods that allow producing high volumes with current processes. The result is an increase in production costs and/or a diminished signal quality due to poor alignment.

As described herein, a larger, more manufacturable and/or lower cost device can be used by adding equalization in the optical signal path. Limited bandwidth devices, such as a larger photodetector, tend to attenuate high frequency portions of the signal. Thus, they act as low pass filters. The systems described herein apply high frequency gain or amplification to the signal to linearize the transfer response or equalize the signal transfer. It will be understood that high frequency attenuation can close a signal eye that represents the signal response for a system, and the closing of the eye can occur due to ISI as well as due to noise. Thus, adding equalization can compensate the signal response and prevent the signal eye from closing.

At the transmitter side, an equalization circuit can include a feed forward equalizer or other mechanism that provide pre-emphasis on the optical signal itself. Such an equalization circuit is typically included in the driver. In one embodiment, the equalization is included in a modulator that puts the high speed signal onto a DC (direct current) light signal. At the receiver side, an equalization circuit can include a continuous time linear equalization filter or other signal amplifier.

It is understood that there are many laser manufacturers that create lasers used in optical communication, such as a vertical cavity surface emitting laser (VCSEL). There are laser devices that terminate to a high voltage reference or voltage supply, and there are laser devices that terminate to a low voltage reference or ground. The different laser devices from different manufacturers are understood to have different characteristics and therefore different performance. At design time of a circuit, such as design of a processor IC with integrated driver or front end circuit, it is not necessarily known what laser device will work best in a transmitter circuit. Additionally, during production of a device, there can be reasons such as pricing and volume control that would benefit from the ability to use different laser devices. As described herein, a driver circuit design enables the use of a laser device of either orientation. Thus, the driver circuit can connect to either the anode or the cathode of the laser device, and provide different gain and different average current for different devices.

FIG. 1 is a block diagram of an embodiment of an optical transceiver with a front end circuit integrated onto a processor IC. Transceiver 100 represents elements of an optical transceiver. More particularly, transceiver 100 includes processor IC (integrated circuit) 110 coupled to optical IC 140. Optical IC 140 represents an integrated circuit device on which one or more optical components (e.g., lasers such as VCSELs (vertical cavity surface emitting lasers), photodiodes) are disposed. A component can be considered disposed on an integrated circuit when it is integrated into the substrate such as by lithographic processing. A component can be considered disposed on a substrate when it is built into a substrate and/or manufactured onto the substrate such as by soldering, wire-bonding, adhering, using flip-chip connection, or other forms of mounting or manufacturing. Both optical IC 140 and processor IC 110 are disposed on a substrate of transceiver 100, and interconnected on the substrate. For example, both ICs can be mounted on the same PCB (printed circuit board).

Processor IC 110 includes process logic 120, which can include, for example, transmit and/or receive processing logic and/or other signal processing logic. Process logic 120 can be implemented as a configured logic array, a processor circuit, controller unit, or other processing element. Process logic 120 processes electrical signals to perform transmit and/or receive functions (TX/RX). Traditionally, processor IC 110 only includes processor logic 120. In one embodiment, processor IC 110 includes front end device 130 integrated on processor IC 110.

Front end device 130 interfaces between optical IC 140 and process logic 120. Thus, front end device 130 can provide an optical to electrical (e.g., digital) conversion, or generate a digital representation of a received optical signal as received by an optical receiver of optical IC 140. In one embodiment, front end device 130 includes a transimpedance amplifier (TIA) that converts a current signal from a photodetector into a digital (e.g., binary stream) representation. In one embodiment, both processor logic 120 and front end 130 are manufactured using CMOS (complementary metal-oxide-semiconductor) technology.

Traditionally, front end device 130 (including a TIA) resides in a discrete O/E (optical to electrical) interface IC. In the traditional approach, front end device 130 can be designed with bond pads that allow an interface with very low electrical parasitics to optical IC 140. For example, an O/E interface IC can be disposed physically close to optical IC 140 and have relatively short bond wires. In one embodiment, front end 130 can be bonded using flip chip technology.

As described herein, in one embodiment, the configuration of front end device 130 can be dynamically changed to interface with optical IC 140. For example, a driver of front end device 130 can provide equalization for a signal to be outputted by a laser of optical IC 140. Additionally, or alternatively, a receive path of front end 130 can include equalization for a signal received by a photodetector of optical IC 140. In one embodiment, a driver of front end device 130 is dynamically modified to connect to a laser at either the cathode or the anode of the laser.

Figure 2:
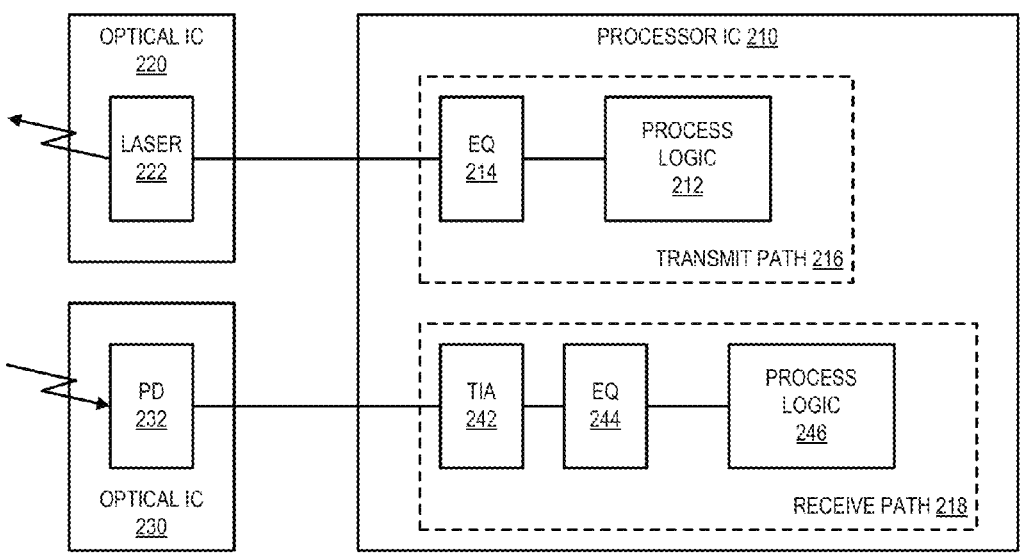
FIG. 2 is a block diagram of an embodiment of an optical transceiver having an optical transmitter path with equalization and an optical receiver path with equalization.

FIG. 2 is a block diagram of an embodiment of an optical transceiver having an optical transmitter path with equalization and an optical receiver path with equalization. Transceiver 200 provides one example of an embodiment of system 100. In transceiver 200, both aspects of an optical transceiver system are illustrated, where optical IC 220 includes laser transmitter 222 (e.g., a VCSEL (vertical cavity surface emitting laser)), and optical IC 230 includes photodetector receiver 232. In one embodiment, both IC 220 and IC 230 are coupled to processor 210, IC 220 coupled to transmit path 216, and IC 230 coupled to receive path 218.

It will be understood that IC 220 and IC 230 can include physical interface hardware such as pins or bumps or pads on the IC itself that connect to corresponding interface hardware on a substrate on which the IC is disposed. Pads, bond wires, traces, or other features enable physical interfacing (including at least an electrical connection) of optical IC 210 to the optical ICs. In one embodiment, processor IC 210 is flip-chip connected to a substrate of transceiver 200 connecting to traces that can then be connected (e.g., via wirebond) to optical IC 220 and optical IC 230.

In one embodiment, transmit path 216 includes process logic 212 and equalization 214. In one embodiment, optical IC 220 is a laser device that includes an array of lasers. A driver of transmit path 216 (not explicitly shown) can include a driver circuit for each laser in the array. Process logic 212 represents logic within processor IC 210 that generates a transmit signal to be outputted by laser 222. Equalization 214 represents logic or other components that perform equalization on the signal used to drive laser 222. In one embodiment, equalization 214 includes an FFE (feed forward equalizer) circuit. Use of equalization 214 can provide pre-emphasis to signals that will be attenuated by laser 222 and/or a far-end photodetector. Thus, equalization 214 can apply high frequency gain to an output signal. The pre-emphasis can allow the optical components to achieve higher bandwidth transfers than what the laser and/or photodetector are rated for.

In one embodiment, receive path 218 includes TIA (transimpedance amplifier) 242, equalization 244, and process logic 246. In one embodiment, optical IC 230 is a photodetector device that includes an array of photodiodes. Receive path 218 can include an equalization circuit each photodiode of the array. Process logic 246 represents logic within processor IC 210 that receives and processes a signal received by photodetector 232. In one embodiment, process logic 246 and process logic 212 are the same process logic, or are logic elements of the same processing component. In one embodiment, photodetector 232 outputs a current that varies in intensity based on the received optical signal. TIA 242 converts the current output of photodetector 232 into a voltage signal that can be processed by the remaining elements in receive path 218. Equalization 244 represents analog or other components that perform equalization on the received signal. In one embodiment, equalization 244 includes a continuous time linear equalizer (CTLE) circuit. Use of equalization 244 compensation to signals that are attenuated by a far-end laser and/or photodetector 232. Thus, equalization 244 can apply high frequency gain to an input signal. The compensation can allow the optical components to achieve higher bandwidth transfers than what the laser and/or photodetector are rated for.

Figure 3A:
FIG. 3A is a block diagram of an embodiment of a transmitter of an optical transceiver.

FIG. 3A is a block diagram of an embodiment of a transmitter of an optical transceiver. Transmitter 302 can represent one example embodiment of a transmitter portion of transceiver 200 and/or system 100. Thus, processor 312 can represent components of processor IC 210. Processor 312 includes data source 322, which can generate data responsive to external components or users (not shown). In one embodiment, data source 322 generates N bits of parallel data, which are serialized by serializer 332. Clock 324 generates clock signal(s) to control the operation of data source 322 and serializer 332. It will be understood that serializer 332 can use a modified or different clock signal from data source 322.

VCSEL driver 334 represents a driver stage that drives the operation of laser 342. Laser 342 is located on an optical IC separate from processor 312. Laser 342 optically transmits the signal generated by data source 322. In one embodiment, driver 334 includes equalization logic or equalization circuitry 336. Driver 334 can include a modulator that modulates a communication signal onto a biased laser. In one embodiment, driver 334 provides equalization 336 in a high speed path of the signal to drive laser 342. In one embodiment, equalization 336 is provided to allow the use of a slower photodetector that will receive the signal driven through laser 342. Using a photodetector with a rating slower (or a lower bandwidth rating) than the bandwidth of the optical signal driver through laser 342 would typically result in intersymbol interference (ISI) effects. However, equalization 336 can allow the use of the slower photodetector, and ease alignment constraints in production due to using a slower but larger receiver device.

Figure 3B:
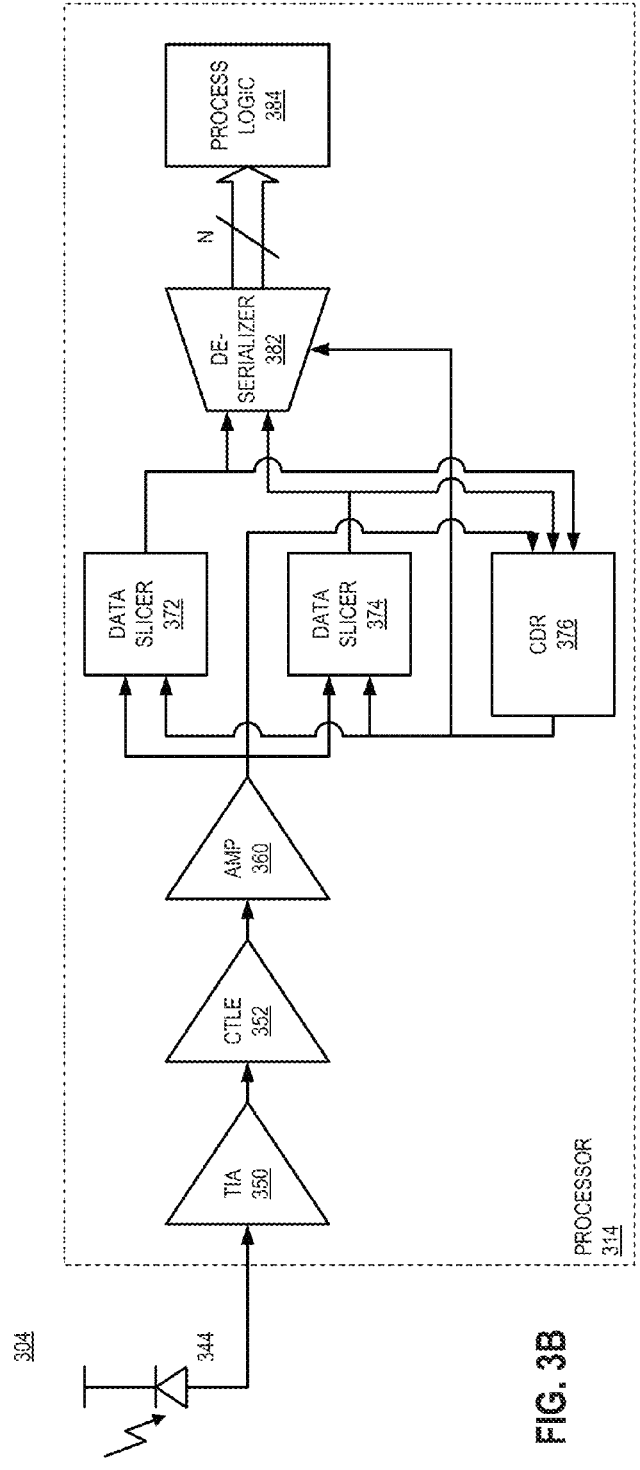
FIG. 3B is a block diagram of an embodiment of a receiver of an optical transceiver.

In one embodiment, equalization 336 is a feed forward equalizer (FFE) embedded within driver 334 that implements a tunable high-pass function equalizing the lower bandwidth receiver for overall lower ISI and jitter. Equalization 336 enables fine control of its transfer function, but can produce an undesired effect of attenuating the signal without attenuating noise, which would tend to reduce the SNR (signal-to-noise ratio). Thus, in one embodiment (such as shown in FIG. 3B), the receive path can include an equalizer to implement a tunable high pass function and attenuating the noise; however its control is coarser. The combination of CTLE and FFE enables good reduction of ISI and jitter without a strong impact on SNR, resulting in a robust communication link.

FIG. 3B is a block diagram of an embodiment of a receiver of an optical transceiver. Receiver 304 can represent one example embodiment of a receiver portion of transceiver 200 and/or system 100. Thus, processor 314 can represent components of processor IC 210. In one embodiment, processor 314 is part of the same processor IC as processor 312 of FIG. 3A.

PD 344 receives an optical signal, and passes it to processor 314. In one embodiment, the processor IC includes a front end circuit, including TIA 350. In one embodiment, TIA 350 is connected to equalizer 352, which can in turn be connected to amplifier 360 to provide further amplification of the signal. In one embodiment, equalizer 352 is a continuous time linear equalizer (CTLE) that implements a tunable high pass function and attenuates the noise. In one embodiment, equalizer 352 does not have fine-grained controllable transfer function. However, it can be effective in compensating for a low bandwidth PD 344, especially in combination with transmitter pre-emphasis.

In one embodiment, amplifier 360 is a limited post amplifier. In one embodiment, the output of amplifier 360 is sampled by data slicers 372 and 374. In one embodiment, the data slicers operate at a half rate clock. The clock (including a half rate clock signal if used) can be generated by CDR (clock and data recovery) circuit 376. The sampled data can then be fed back to CDR 376 to synchronize the clock signal, as well as being fed to deserializer 382 to generate an N-bit parallel digital signal. Process logic 384 receives the parallel signal and processes it.

Figure 4B:
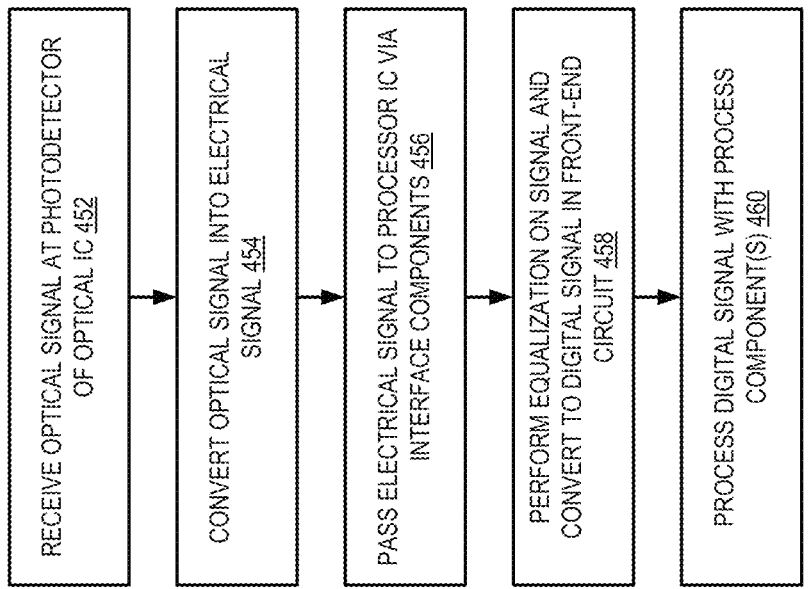
FIG. 4B is a flow diagram of an embodiment of receiving a signal with an optical transceiver that includes receiver-side equalization.
Figure 4A:
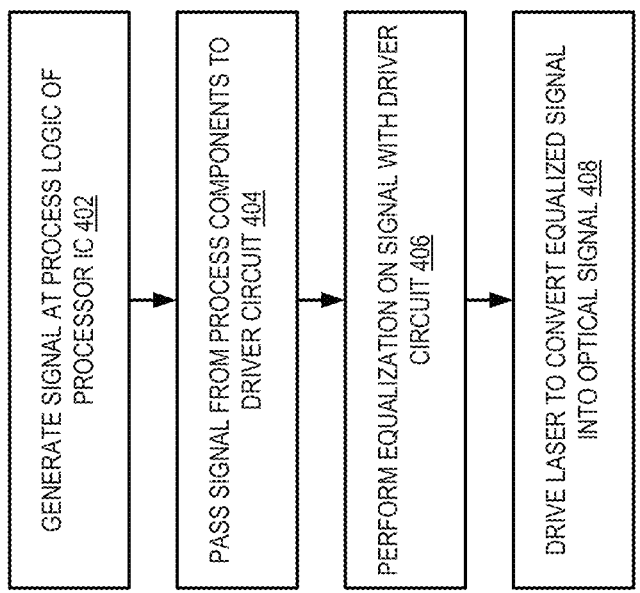
FIG. 4A is a flow diagram of an embodiment of transmitting a signal with an optical transceiver that includes transmit-side equalization.

FIG. 4A is a flow diagram of an embodiment of transmitting a signal with an optical transceiver that includes transmit-side equalization. In one embodiment, process logic of a transmit path of a processor IC generates a signal to transmit, 402. The process logic can pass the generated signal from the process component(s) to a driver circuit that will drive the optical component(s), 404. In one embodiment, the driver circuit performs equalization on the signal with an equalizer embedded in the driver circuit, 406. The driver circuit drives a laser of an optical IC to convert the equalized digital signal into an optical signal, 408.

FIG. 4B is a flow diagram of an embodiment of receiving a signal with an optical transceiver that includes receiver-side equalization. A photodetector of an optical IC receives an optical signal from a far-end laser transmitter, 452. In one embodiment, the received signal was prepared with equalization to allow for use of a lower-bandwidth photodetector. The photodetector converts the optical signal into an electrical signal, 454, which it then passes to a processor IC via hardware interface components, 456. In one embodiment, the receiver path of the processor IC includes a front end circuit that performs equalization of the electrical signal and converts it to a digital signal, 458. The front end circuit passes the digital signal to process component(s) of the processor IC to process the digital signal, 460.

Figure 5:
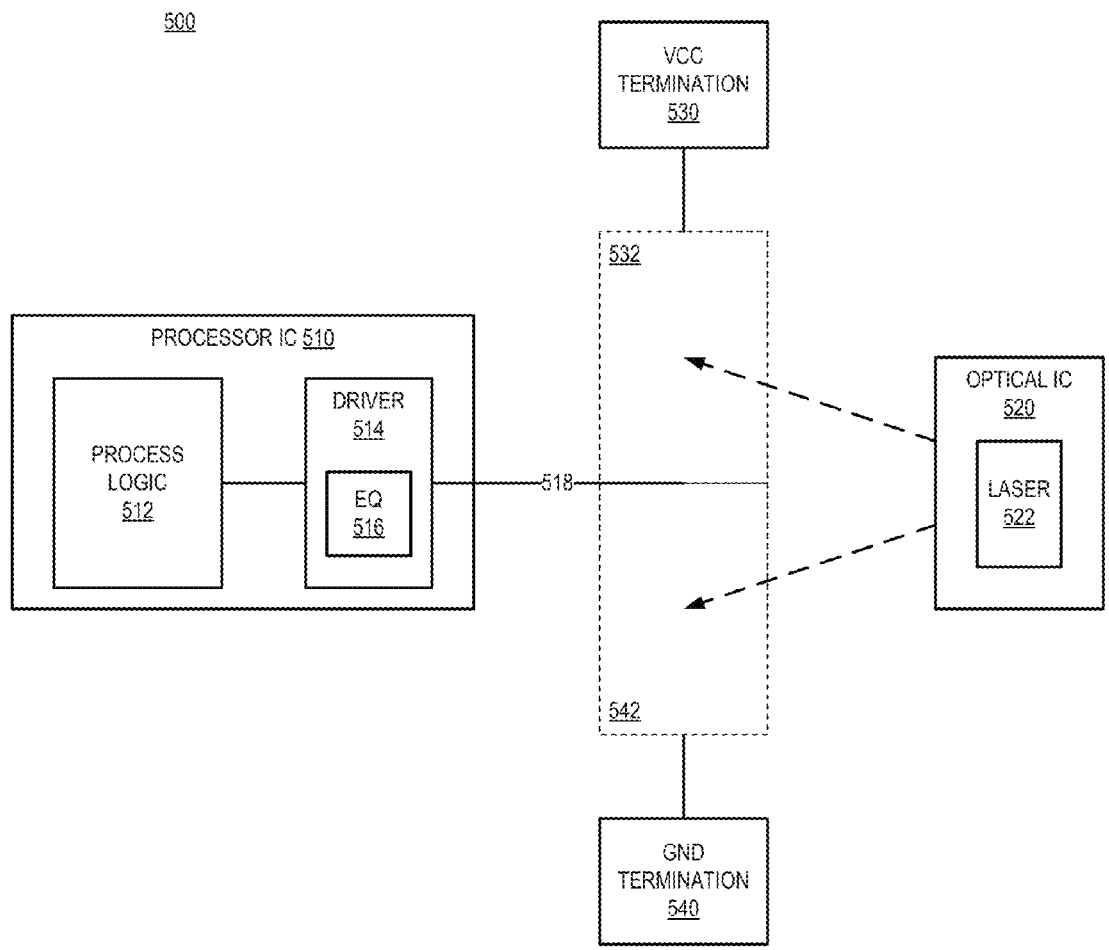
FIG. 5 is a block diagram of an embodiment of a transmitter that can receive either a voltage source terminated or a ground terminated laser device.

FIG. 5 is a block diagram of an embodiment of a transmitter that can receive either a voltage source terminated or a ground terminated laser device. The drawing illustrates a logical view of a layout for transmitter 500. Processor IC 510 includes process logic 512, which generates a signal to transmit optically via a laser device. In one embodiment, processor IC 510 includes driver 514 with equalization 516 that can be used to equalize a signal to send via the laser device.

Transmitter 500 is disposed on a substrate that includes a connection place for either a ground terminated or source terminated laser device. As illustrated, location 532 provides a place for a source terminated laser, and location 542 provides a place for a ground terminated laser. Location 532 connects between signal line 518 of processor 510 and VCC termination 530. Location 542 connects between signal line 518 of processor 510 and GND termination 540.

Optical IC 520 includes laser 522, which can terminate to either ground or VCC. In one embodiment, multiple places 532 and 542 can be placed on a substrate (e.g., printed circuit board PCB), which can allow for the use of many different optical ICs from different manufacturers, even if they have different pin layouts. Regardless of what laser 522 is placed in transmitter 500, the driver and circuit design of processor IC 510 does not need to be changed. Rather, the operation of driver 514 is changed to adjust for connecting to either orientation of laser device. The description of FIGS. 6A-6C below provides more detail of one embodiment.

Figures 6A, 6B:
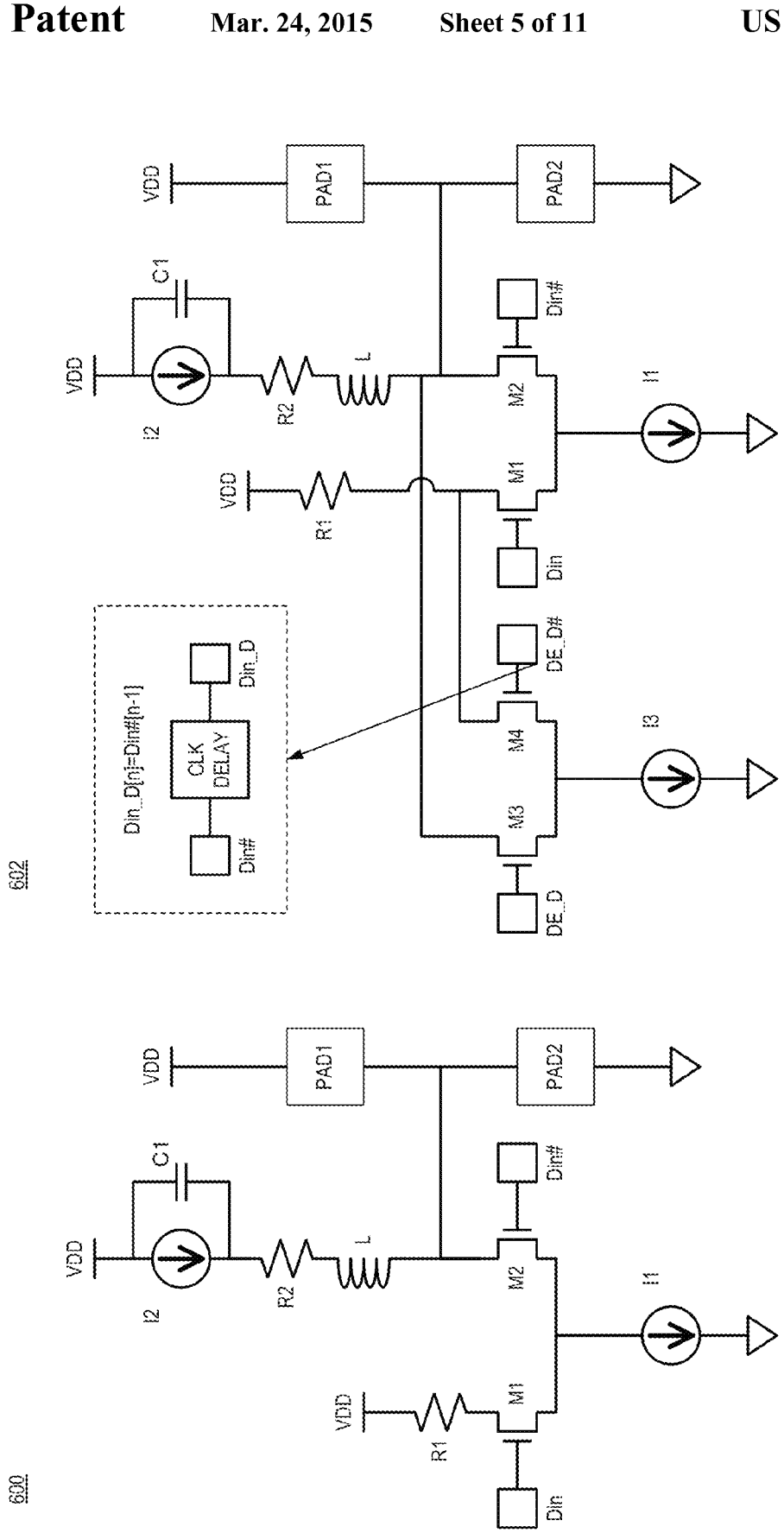

FIGS. 6A-6C are block diagrams of an embodiment of a transmitter that can receive either a voltage source terminated or a ground terminated laser device. Referring to FIG. 6A, circuit 600 illustrates one example embodiment of portion of driver 514 of FIG. 5. Din and Din# represent a differential signal used to drive the laser. Din is received at transistor M1, and Din# is received at M2, which are coupled together in a differential configuration. The drain or output terminal of M1 connects to VDD through R1, and the source or reference terminal is coupled to the input of current source I1. Din is received at the gate or control terminal of M1.

Din# is received at the control terminal of M2. The reference terminal of M2 is also connected to the input of I1 and the reference terminal of M1. The output of I1 is ground. It will be understood that whatever current, i1 (the current that passes through I1) that is not provided through M1 will be provided through M2, and vice versa. The output terminal of M2 is connected to PAD1, PAD2. The output terminal of M2 is also connected up to the output of current source I2. In one embodiment, the output terminal of M2 is connected to the output of current source I2 via inductor L and resistor R2.

In one embodiment, circuit 600 is part of a processor IC that is flip chip bonded to a substrate. A laser device is connected to either PAD1 or PAD2, which will be connected face-up. The electrical connection from a circuit 600 as part of a driver in a flip-chip bonded processor IC to a face-up laser is relatively long at the frequencies of operation, which can result in reflections at the high frequencies. Using inductor L in the termination can improve the driver return loss, but controlling peaking. Thus, L can suppress reflection currents to compensate for the length of the connections to PAD1 and PAD 2.

In one embodiment, circuit 600 is designed for flexibility, to connect to either a cathode (PAD1) or anode (PAD2) of a laser device, depending on device orientation. Including I2 in circuit 600 can allow the driver to connect to either a cathode or an anode. I2 is adjustable, and controls the average current through the laser. It will be understood that either PAD1 or PAD2 will be used, and thus the other will remain open and not part of the active circuit. Thus, when PAD1 is used, the current through the laser will flow down through M2. When PAD2 is used, the current from I2 will be split between M2 and the laser. Thus, the value of I2 can be used to control the average laser current. By changing I2 the average current can be controlled to be positive or negative, and the value can be changed in addition to the sign of the average current. Thus, a single output circuit in a driver can be used to connect to any of a variety of different laser devices. In one embodiment, circuit 600 includes capacitor C1 in parallel with I2, which serves as a virtual ground connection to create an impedance matched termination to improve signal integrity. It will be understood that the current source I2 provides a DC bias current to the laser device.

Referring to FIG. 6B, circuit 602 is an embodiment of circuit 600 with equalization (more specifically, an embodiment of a feed forward equalizer implementation). Circuit 602 can be said to have an output sub-circuit (original circuit 600 as in FIG. 6A) and an equalization sub-circuit. Circuit 602 illustrates M3 and M4 coupled at their reference terminals to current source I3. M3 receives a signal "Din_D" or Din delayed, while M4 receive a signal Din_D#. As shown in the inset box, Din_D# is a delayed version of Din. In one embodiment (as shown), it is also inverted. More specifically, Din_D#[n]=Din[n−1] and Din_D[n]=Din#[n−1]. In one embodiment, the output terminal or drain of M4 is connected to the output terminal of M1, and the output terminal of M3 is connected to the output terminal of M2, which is also the circuit output. As is understood, the addition of the inverted, delayed signal causes the outputs of the sub-circuits to be the sum of the currents from their respective transistors. In one embodiment, I3 is of a different value than I1, which allows the sub-circuits to provide a weighted sum. While equalization using two current sources and a single delayed, inverted version of the input signal is shown, the equalization sub-circuit can receive as input multiple versions of the input signal with different delays, each either inverted or not inverted. The multiple versions can control multiple transistor pairs similar to M3 and M4 and current sources similar to I3. It will be understood that the equalization circuit shown is merely exemplary, and any other form of equalization circuit could be used in the alternative.

Referring to FIG. 6C, circuit 604 is an embodiment of circuit 600 with laser device 612 connected at PAD1. Laser device 612 connects to VDD. Current source I2 is shown as I2-1, referring to the fact that the current source is configured to output a smaller current (e.g., a negative current), because laser device 612 will provide current. Referring to FIG. 6D, circuit 606 is an embodiment of circuit 600 with laser device 614 connected at PAD2. Laser device 614 connects to GND. Current source I2 is shown as I2-2, referring to the fact that the current source is configured to output a larger current, because laser device 614 requires current to output light. Circuits 604 and 606 include capacitor C1 and in one embodiment can include an equalization sub-circuit such as the one shown in circuit 602 of FIG. 6B.

Figure 7:
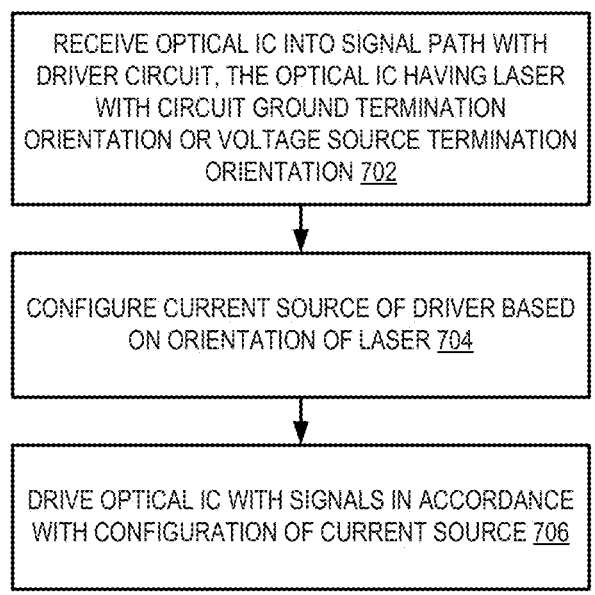
FIG. 7 is a flow diagram of an embodiment of configuring a driver to work with a laser device having either ground termination or supply termination orientation.

FIG. 7 is a flow diagram of an embodiment of configuring a driver to work with a laser device having either ground termination or supply termination orientation. An optical transceiver module receives an optical IC in to a signal path with a driver circuit, where the optical IC includes a laser device with a ground termination orientation or a voltage source termination orientation, 702. In one embodiment, the laser device is a laser array, and each laser of the array is driven with a driver circuit. The ground termination can refer to a circuit ground or a low-voltage reference of a circuit, which is not necessarily the same as earth ground.

In one embodiment, a circuit operator inputs a configuration setting based on the type of laser device to be connected in the transceiver. The driver circuit sets a configuration of a current source of the driver based on the orientation of the laser, 704. The driver can then drive the optical IC with signals in accordance with the configuration of the current source and the laser connected, 706.

Figure 8A:
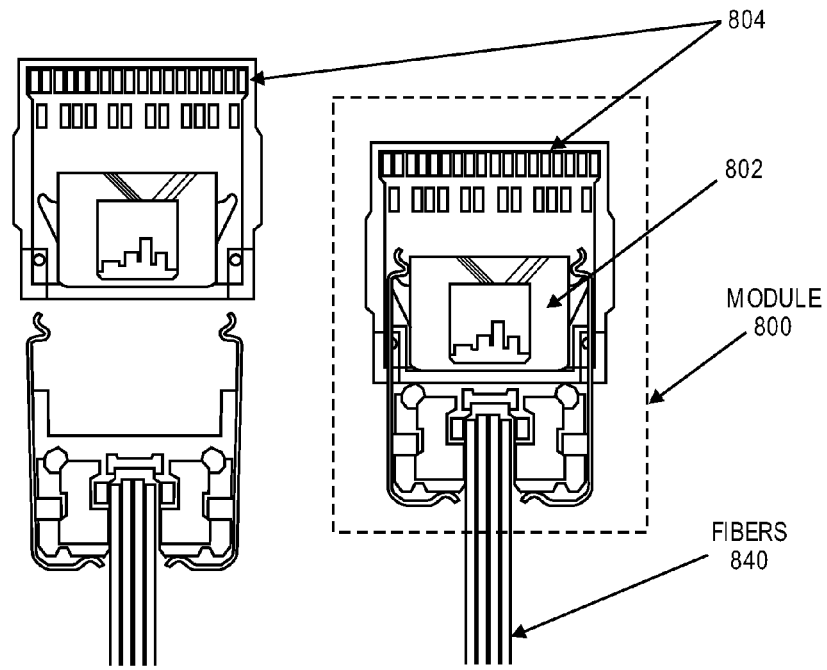
FIGS. 8A-8B represent an optical transceiver system in accordance with any embodiment described herein.
Figure 8B:
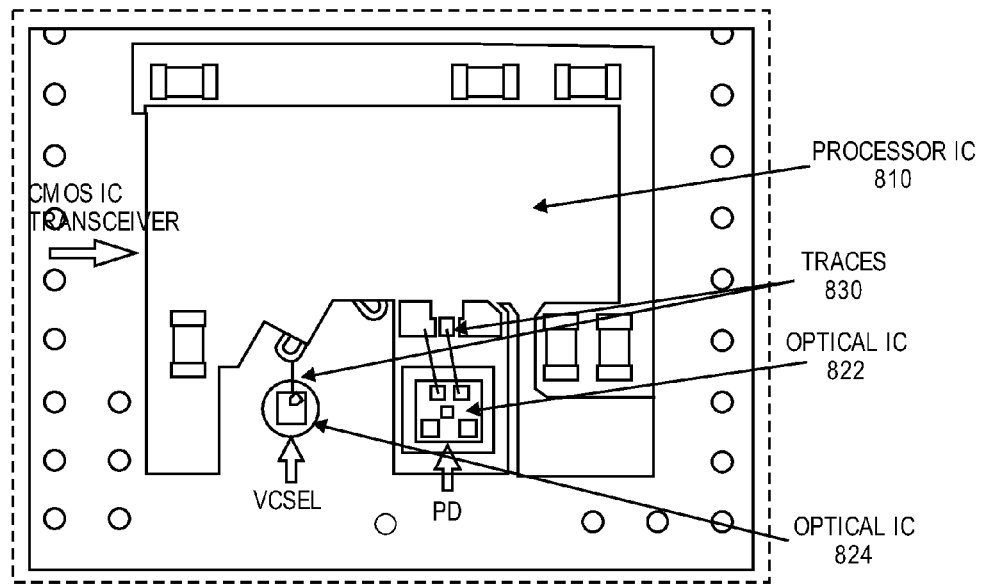

FIGS. 8A-8B represent an optical transceiver system in accordance with any embodiment described herein. Referring to FIG. 8A, module 800 is part of an optical transceiver. Module 800 includes a substrate or PCB on which a processor IC and optical IC are mounted as seen in portion 802 (see FIG. 8B). Portion 802 can be a metal ground top layer of PCB or substrate 804 of module 800. In one embodiment a plastic cover, or cover of other material optically transparent at the communication frequency of interest, is included in transceiver module 800. The cover can provide transmitter and receiver lens systems, and couple into an OM1 (62.5/125 um) multimode or other types of TX/RX fiber pair (fibers 840) via a simple connector.

The pads at the top of PCB 804 were used for contacts inside a socket. The lens systems can include 90 degree bending mirrors enabling a side connection of the fiber to the module and bringing the full solution (transceiver module and fiber connector) to a height of merely 1.85 mm, which allows for implementation in laptops and handheld devices.

In accordance with one specific configuration tested, module 800 provided a low cost and small form factor solution while exhibiting full duplex error free performance at 25 Gb/s, and consuming low power. In one embodiment, transceiver module 800 can be designed to support four channels, which each support 25 Gb/s communication, each channel using a pair of VCSELs and photodiodes, and all four channels being processed with all necessary TX/RX logic in a processor IC (e.g., processor IC 810 of portion 802).

Referring to FIG. 8B, the ICs (e.g., processor IC, optical IC 822, and optical IC 824) are connected via traces 830, which can include PCB traces, pads and bondwires (as shown). Optical IC 822 includes one or more PDs (e.g., one PD or an array), and processor IC 810 processes signals received via the PD. Optical IC 824 includes one or more VCSELs (e.g., one laser or an array), and processor IC 810 processes signals to send via the laser. As shown, the photodiode is wire bonded onto pads on a 12 mm×12 mm standard FR-4 PCB, and the photodiode connects via the board traces to a CMOS transceiver IC, which is flip-chip soldered onto the PCB. Similarly, the laser is wire bonded onto pads, and the laser connects via the board traces to the CMOS transceiver IC.

The PD used in testing was specified for a 12.5 Gb/s data rate (with typical −3 dB bandwidth of 15.8 GHz, 32 um aperture, capacitance of 135 fF, and 0.5 A/W responsivity at 850 nm), but was used at 25 Gb/s. The processor IC (810) was fabricated with a standard 28 nm CMOS process and integrates all required TX/RX circuits.

In one embodiment, the circuit is usable in an optical small form factor pluggable (SFP) transceiver. The PCB includes pads to connect to a peripheral port, and includes the optical IC and the processor IC in accordance with any embodiment described herein. The transceiver can be enclosed in an appropriate housing to interface with a corresponding port. In one embodiment, the same transceiver can be integrated onto a PCB of a computing device and used as a peripheral port.

In one embodiment, processor IC 810 includes a driver circuit with an equalization circuit that applies high frequency gain or other high pass response to a signal to be transmitted via the VCSEL. In one embodiment, processor IC 810 includes an optical receiver front end circuit with an equalization circuit that applies high frequency gain or other high pass response to a received signal. In one embodiment, module 800 includes a flexible laser connection, which can receive a laser device oriented either with a connection to ground or a connection to the voltage supply.

Figure 9:
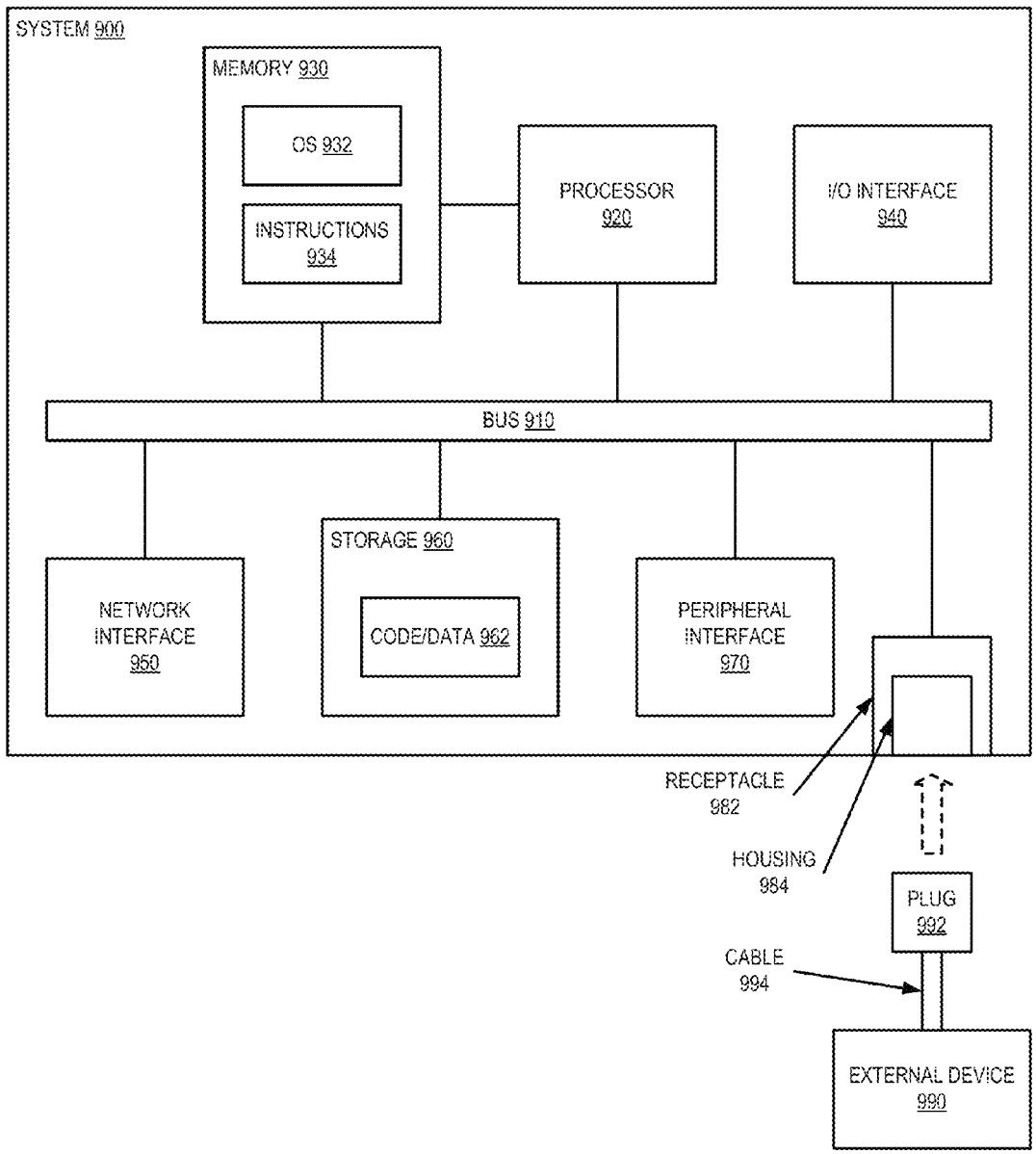
FIG. 9 is a block diagram of an embodiment of a computing system in which an optical transceiver can be used.

FIG. 9 is a block diagram of an embodiment of a computing system in which an optical transceiver can be used. System 900 represents a computing device in accordance with any embodiment described herein, and can be a laptop computer, a desktop computer, a server, a gaming or entertainment control system, a scanner, copier, printer, or other electronic device. System 900 includes processor 920, which provides processing, operation management, and execution of instructions for system 900. Processor 920 can include any type of microprocessor, central processing unit (CPU), processing core, or other processing hardware to provide processing for system 900. Processor 920 controls the overall operation of system 900, and can be include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 930 represents the main memory of system 900, and provides temporary storage for code to be executed by processor 920, or data values to be used in executing a routine. Memory 930 can include one or more memory devices such as read-only memory (ROM), flash memory, one or more varieties of random access memory (RAM), or other memory devices, or a combination of such devices. Memory 930 stores and hosts, among other things, operating system (OS) 932 to provide a software platform for execution of instructions in system 900. Additionally, other instructions 934 are stored and executed from memory 930 to provide the logic and the processing of system 900. OS 932 and instructions 934 are executed by processor 920.

Processor 920 and memory 930 are coupled to bus/bus system 910. Bus 910 is an abstraction that represents any one or more separate physical buses, communication lines/interfaces, and/or point-to-point connections, connected by appropriate bridges, adapters, and/or controllers. Therefore, bus 910 can include, for example, one or more of a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 910 can also correspond to interfaces in network interface 950.

System 900 also includes one or more input/output (I/O) interface(s) 940, network interface 950, one or more internal mass storage device(s) 960, and peripheral interface 970 coupled to bus 910. I/O interface 940 can include one or more interface components through which a user interacts with system 900 (e.g., video, audio, and/or alphanumeric interfacing). Network interface 950 provides system 900 the ability to communicate with remote devices (e.g., servers, other computing devices) over one or more networks. Network interface 950 can include an Ethernet adapter, wireless interconnection components, USB (universal serial bus), or other wired or wireless standards-based or proprietary interfaces.

Storage 960 can be or include any conventional medium for storing large amounts of data in a nonvolatile manner, such as one or more magnetic, solid state, or optical based disks, or a combination. Storage 960 hold code or instructions and data 962 in a persistent state (i.e., the value is retained despite interruption of power to system 900). Storage 960 can be generically considered to be a "memory," although memory 930 is the executing or operating memory to provide instructions to processor 920. Whereas storage 960 is nonvolatile, memory 930 can include volatile memory (i.e., the value or state of the data is indeterminate if power is interrupted to system 900).

Peripheral interface 970 can include any hardware interface not specifically mentioned above. Peripherals refer generally to devices that connect dependently to system 900. A dependent connection is one where system 900 provides the software and/or hardware platform on which an operation executes, and with which a user interacts.

In one embodiment, system 900 can include one or more receptacles 982 with housing 984 to receive plug 992 or mate with plug 992 to connect to external device 990. Receptacle 982 includes housing 984, which provides the mechanical connection mechanisms. As used herein, mating one connector with another refers to providing a mechanical connection. The mating of one connector with another typically also provides a communication connection. Receptacle 982 can connect directly to one or more buses of bus system 910, or receptacle 982 can be associated directly with one or more devices, such as network interface 950, I/O interface 940, storage 960, peripheral interface 970, or processor 920.

Plug 992 is a connector plug that allows external device 990 (which can be any of the same types of devices discussed above) to interconnect with device 900. Plug 992 can be directly built into external device 990 (with or without a cord or cable 994), or can be interconnected to external device 990 via a standalone cable 994. In one embodiment, plug 992 supports communication via an optical interface or both an optical interface and an electrical interface. The interconnection of receptacle 982 to bus 910 can similarly include an optical path or both an optical and electrical signal path. Receptacle 982 can also include an optical communication connection that is converted to an electrical signal prior to being placed on bus 910.

In one embodiment, one or more components of system 900 include an optical interface. The optical components can interface with one or more other components internally to system 900, and/or with one or more external devices 990 via receptacle(s) 982. Receptacle 982 provides the hardware port through which external optical signals can be exchanged, for example, with peripheral devices. The optical interface can be performed with an optical transceiver in accordance with any embodiment described herein. In one embodiment, the optical transceiver includes a driver circuit with an equalization circuit that applies high frequency gain or other high pass response to a signal to be transmitted via a laser. In one embodiment, the optical transceiver includes an optical receiver front end circuit with an equalization circuit that applies high frequency gain or other high pass response to a received signal. In one embodiment, the optical transceiver includes a flexible laser connection, which can receive a laser device oriented either with a connection to ground or a connection to the voltage supply.

Figure 10:
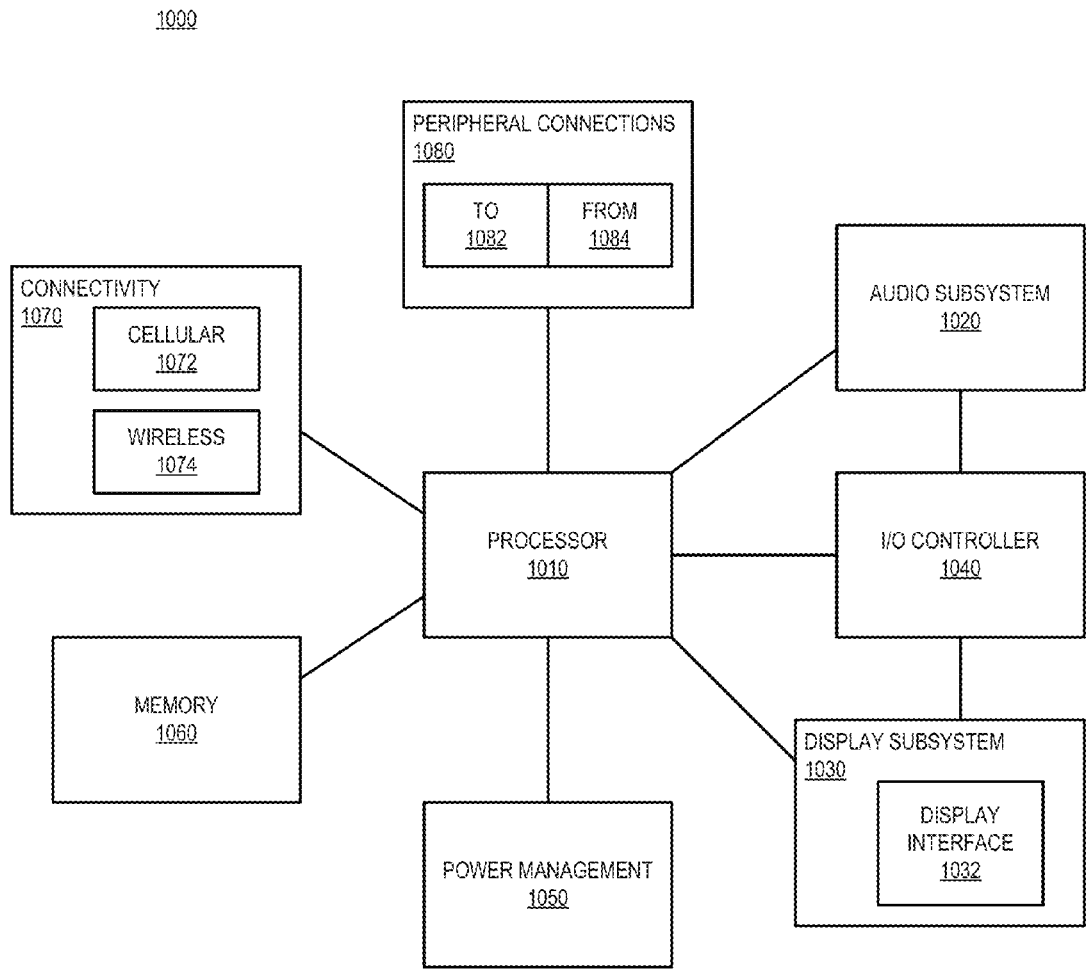
FIG. 10 is a block diagram of an embodiment of a mobile device in which an optical transceiver can be used.

FIG. 10 is a block diagram of an embodiment of a mobile device in which an optical transceiver can be used. Device 1000 represents a mobile computing device, such as a computing tablet, a mobile phone or smartphone, a wireless-enabled e-reader, or other mobile device. It will be understood that certain of the components are shown generally, and not all components of such a device are shown in device 1000.

Device 1000 includes processor 1010, which performs the primary processing operations of device 1000. Processor 1010 can include one or more physical devices, such as microprocessors, application processors, microcontrollers, programmable logic devices, or other processing means. The processing operations performed by processor 1010 include the execution of an operating platform or operating system on which applications and/or device functions are executed. The processing operations include operations related to I/O (input/output) with a human user or with other devices, operations related to power management, and/or operations related to connecting device 1000 to another device. The processing operations can also include operations related to audio I/O and/or display I/O.

In one embodiment, device 1000 includes audio subsystem 1020, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1000, or connected to device 1000. In one embodiment, a user interacts with device 1000 by providing audio commands that are received and processed by processor 1010.

Display subsystem 1030 represents hardware (e.g., display devices) and software (e.g., drivers) components that provide a visual and/or tactile display for a user to interact with the computing device. Display subsystem 1030 includes display interface 1032, which includes the particular screen or hardware device used to provide a display to a user. In one embodiment, display interface 1032 includes logic separate from processor 1012 to perform at least some processing related to the display. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to device 1000 through which a user might interact with the system. For example, devices that can be attached to device 1000 might include microphone devices, speaker or stereo systems, video systems or other display device, keyboard or keypad devices, or other I/O devices for use with specific applications such as card readers or other devices.

As mentioned above, I/O controller 1040 can interact with audio subsystem 1020 and/or display subsystem 1030. For example, input through a microphone or other audio device can provide input or commands for one or more applications or functions of device 1000. Additionally, audio output can be provided instead of or in addition to display output. In another example, if display subsystem includes a touchscreen, the display device also acts as an input device, which can be at least partially managed by I/O controller 1040. There can also be additional buttons or switches on device 1000 to provide I/O functions managed by I/O controller 1040.

In one embodiment, I/O controller 1040 manages devices such as accelerometers, cameras, light sensors or other environmental sensors, gyroscopes, global positioning system (GPS), or other hardware that can be included in device 1000. The input can be part of direct user interaction, as well as providing environmental input to the system to influence its operations (such as filtering for noise, adjusting displays for brightness detection, applying a flash for a camera, or other features).

In one embodiment, device 1000 includes power management 1050 that manages battery power usage, charging of the battery, and features related to power saving operation. Memory subsystem 1060 includes memory device(s) 1062 for storing information in device 1000. Memory subsystem 1060 can include nonvolatile (state does not change if power to the memory device is interrupted) and/or volatile (state is indeterminate if power to the memory device is interrupted) memory devices. Memory subsystem 1060 can store application data, user data, music, photos, documents, or other data, as well as system data (whether long-term or temporary) related to the execution of the applications and functions of system 1000.

Connectivity 1070 includes hardware devices (e.g., wireless and/or wired connectors and communication hardware) and software components (e.g., drivers, protocol stacks) to enable device 1000 to communicate with external devices. The device could be separate devices, such as other computing devices, wireless access points or base stations, as well as peripherals such as headsets, printers, or other devices.

Connectivity 1070 can include multiple different types of connectivity. To generalize, device 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1074 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication (including optical communication) occurs through a solid communication medium.

Peripheral connections 1080 include hardware interfaces and connectors, as well as software components (e.g., drivers, protocol stacks) to make peripheral connections. It will be understood that device 1000 could both be a peripheral device ("to" 1082) to other computing devices, as well as have peripheral devices ("from" 1084) connected to it. Device 1000 commonly has a "docking" connector to connect to other computing devices for purposes such as managing (e.g., downloading and/or uploading, changing, synchronizing) content on device 1000. Additionally, a docking connector can allow device 1000 to connect to certain peripherals that allow device 1000 to control content output, for example, to audiovisual or other systems.

In addition to a proprietary docking connector or other proprietary connection hardware, device 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, any one or more of the interconnections or I/O can be performed optically. Thus, I/O controller 1040, display subsystem 1030, memory 1060, connectivity 1070, and/or peripheral connections 1080 can have an optical connection with processor 1010 or with an external component. In the case of an optical connection, an optical transceiver in accordance with any embodiment described herein can be used. In one embodiment, the optical transceiver includes a driver circuit with an equalization circuit that applies high frequency gain or other high pass response to a signal to be transmitted via a laser. In one embodiment, the optical transceiver includes an optical receiver front end circuit with an equalization circuit that applies high frequency gain or other high pass response to a received signal. In one embodiment, the optical transceiver includes a flexible laser connection, which can receive a laser device oriented either with a connection to ground or a connection to the voltage supply.

Figure 11:
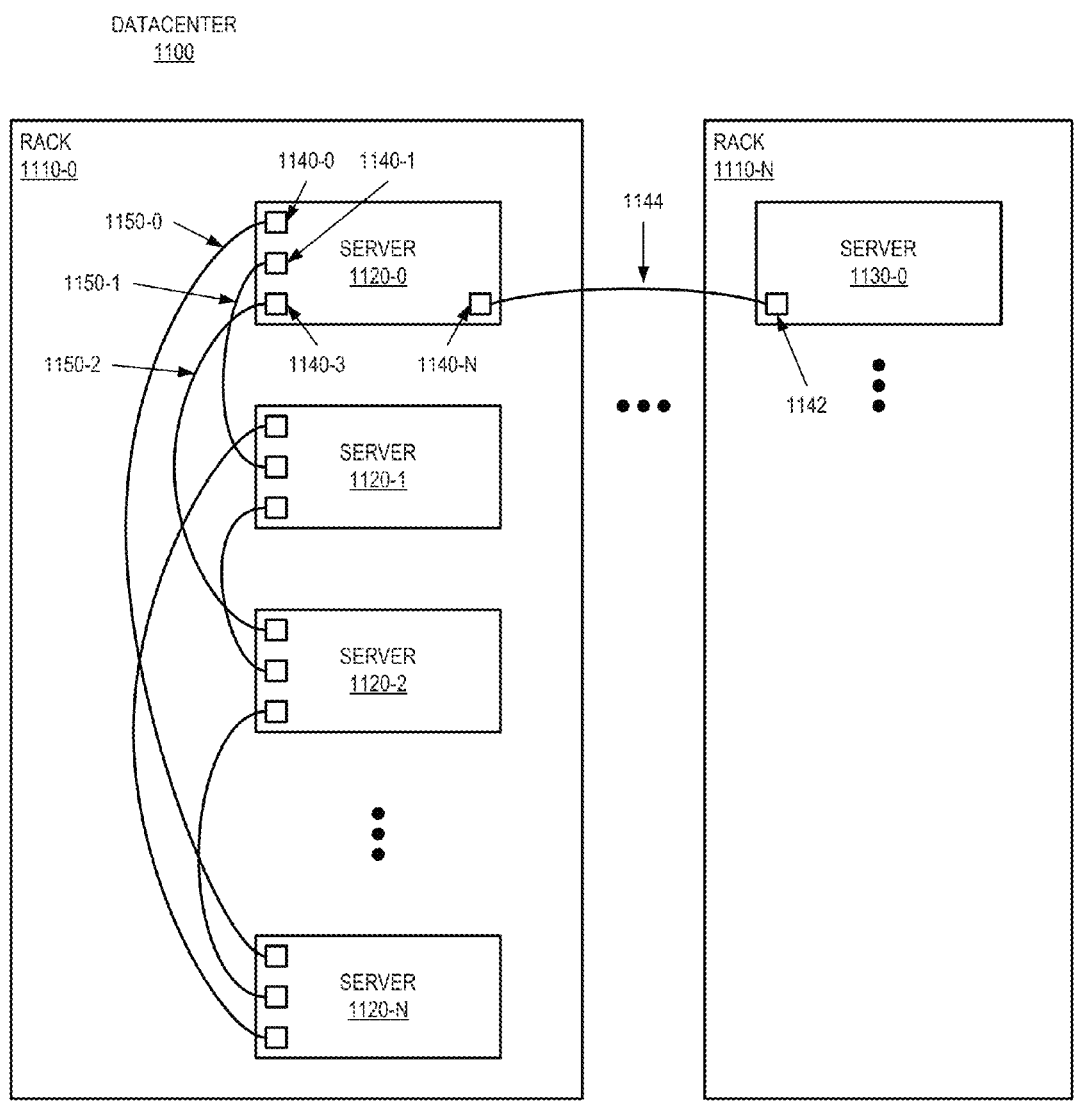
FIG. 11 is a block diagram of an embodiment of a data center in which an optical transceiver can be used.

FIG. 11 is a block diagram of an embodiment of a data center in which an optical transceiver can be used. Datacenter 1100 includes a plurality of server racks 1110-0 through 1110-N. Each server rack includes a plurality of server machines, such as 1120-0 through 1120-N of server rack 1110-0. A server machine is a physical computer (a computer hardware system) including at least one logic processor, which can include single and/or multicore processor devices, graphics processors, and/or other processing unit. Each server machine includes at least one connector with multiple rows of contacts to be used with pluggable devices having multiple rows of pads, and can include a plurality of connector systems (e.g., 1140-0, 1140-1, 1140-2). In one embodiment, each connector provides a physical port to which a plug cable assembly (e.g., 1150-0, 1150-1, 1150-2) is mated. In one embodiment, the plug cable assemblies are optical plug cable assemblies, and each connector provides a high-speed, high-bandwidth electrical port to which the optical cable is connected. The plug cable assemblies form a physical link between connectors in separate machines (e.g., intra-rack connections between server machines 1120-0 through 1120-N, or between a server machine and a TOR switch, inter-rack connections between server machines 1120-0 and 1130-0 (with ports 1140-N and 1142 via cable 1144, or other connections). In any of the optical connections, an optical transceiver in accordance with any embodiment described herein can be used. In one embodiment, the optical transceiver includes a driver circuit with an equalization circuit that applies high frequency gain or other high pass response to a signal to be transmitted via a laser. In one embodiment, the optical transceiver includes an optical receiver front end circuit with an equalization circuit that applies high frequency gain or other high pass response to a received signal. In one embodiment, the optical transceiver includes a flexible laser connection, which can receive a laser device oriented either with a connection to ground or a connection to the voltage supply.

In one aspect, an optical transceiver system includes a laser device; and a driver circuit to drive the laser device, the driver circuit including an equalizer that generates high frequency gain to a signal to be transmitted via the laser device.

In one embodiment, the laser device comprises a VCSEL (vertical cavity surface emitting laser). In one embodiment, the laser device includes an array of lasers, and the driver circuit includes a driver circuit for each laser in the array. In one embodiment, the equalizer comprises a feed forward equalizer circuit. In one embodiment, the driver circuit includes the equalizer in a high-speed path of the signal. In one embodiment, the driver circuit comprises a modulator including the equalizer. In one embodiment, the driver circuit drives the laser device at a frequency higher than its rated bandwidth.

In one aspect, an optical transceiver system includes a photo detector device; a transimpedance amplifier (TIA) coupled to the photo detector device to convert an optical signal received at the photo detector device into an electrical signal; and an equalization circuit coupled to the TIA to generate high frequency gain in the electrical signal.

In one embodiment, the equalization circuit comprises a continuous time linear equalizer (CTLE) circuit. In one embodiment, the photo detector device includes an array of photodiodes, and the equalization circuit includes applies equalization for each photodiode of the array. In one embodiment, the photo detector device operates at a frequency higher than its rated bandwidth.

In one aspect, an optical small form factor pluggable (SFP) transceiver includes a printed circuit board (PCB) including pads to electrically connect to a peripheral port; an optical transmitter integrated circuit (IC) disposed on the PCB; an optical receiver IC disposed on the PCB; and a processor IC disposed on the PCB, including signal processing logic, a driver circuit to drive a VCSEL (vertical cavity surface emitting laser) of the optical transmitter IC, the driver circuit including an equalizer that applies high frequency gain to a signal to be transmitted via the VCSEL, and an optical receiver front end circuit including a transimpedance amplifier (TIA) coupled to the optical receiver IC to convert an optical signal received at a photodiode of the optical receiver IC into an electrical signal, and an equalization circuit coupled to the TIA to apply high frequency gain to the electrical signal; and a connector housing to at least partially enclose the printed circuit board.

In one embodiment, the optical transmitter IC includes a VCSEL array and the optical receiver IC includes a photodiode array, wherein the connector housing includes an array of lenses corresponding to the array of VCSELs and the array of photodiodes. In one embodiment, the driver equalizer comprises a feed forward equalizer circuit, and wherein the equalization circuit comprises a continuous time linear equalizer (CTLE) circuit. In one embodiment, both the optical transmitter IC and the optical receiver IC operate at a frequency higher than their respective rated bandwidths.

In one aspect, an optical transmitter device includes a connection point to interface with a laser device, wherein the connection point is configured to connect to either a laser device that couples between the connection point and a supply voltage, or a laser device that couples between the connection point and a circuit ground; and a driver circuit to drive the laser device, including providing an output signal at the connection point, wherein the driver circuit includes a variable current source configured to produce a first current when a laser device that couples between the connection point and a supply voltage is connected, or to produce a second current different from the first current when a laser device that couples between the connection point and a circuit ground is connected.

In one embodiment, the driver circuit further comprising an inductor in a signal path of the driver circuit coupled to the connection point, the inductor configured to suppress reflection current. In one embodiment, the driver circuit further comprising a capacitor in parallel with the variable current source. In one embodiment, the driver circuit further comprising an equalizer to apply high frequency gain to an optical signal to be transmitted by the laser device.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An optical transceiver system comprising:
   a laser device; and
   a driver circuit to drive the laser device, the driver circuit comprising an equalizer that generates high frequency gain to a signal to be transmitted via the laser device, wherein the equalizer is embedded within the driver circuit.

2. The optical transceiver system of claim 1, wherein the laser device comprises a VCSEL (vertical cavity surface emitting laser).

3. The optical transceiver system of claim 1, wherein the laser device includes an array of lasers, and the driver circuit includes a driver circuit for each laser in the array.

4. The optical transceiver system of claim 1, wherein the equalizer comprises a feed forward equalizer circuit.

5. The optical transceiver system of claim 1, wherein the driver circuit includes the equalizer in a high-speed path of the signal.

6. The optical transceiver system of claim 1, wherein the driver circuit comprises a modulator including the equalizer.

7. The optical transceiver system of claim 1, wherein the driver circuit drives the laser device at a frequency higher than its rated bandwidth.

8. An optical transceiver system comprising:
a photo detector device having a first bandwidth to receive an optical signal having a second bandwidth, the first bandwidth being lower than the second bandwidth;
a transimpedance amplifier (TIA) coupled to the photo detector device to convert the optical signal received at the photo detector device into an electrical signal; and
an equalization circuit coupled to the TIA to generate a high frequency gain in the electrical signal to compensate for the first bandwidth of the photo detector.

9. The optical transceiver system of claim 8, wherein the equalization circuit comprises a continuous time linear equalizer (CTLE) circuit.

10. The optical transceiver system of claim 8, wherein the photo detector device includes an array of photodiodes, and the equalization circuit includes applies equalization for each photodiode of the array.

11. The optical transceiver system of claim 8, wherein the photo detector device operates at a frequency higher than its rated bandwidth.

12. An optical small form factor pluggable (SFP) transceiver comprising:
a printed circuit board (PCB) including
pads to electrically connect to a peripheral port;
an optical transmitter integrated circuit (IC) disposed on the PCB;
an optical receiver IC disposed on the PCB; and
a processor IC disposed on the PCB, including
signal processing logic,
a driver circuit to drive a VCSEL (vertical cavity surface emitting laser) of the optical transmitter IC, the driver circuit comprising an equalizer that applies high frequency gain to a signal to be transmitted via the VCSEL, wherein the equalizer is embedded within the driver circuit; and
an optical receiver front end circuit including a transimpedance amplifier (TIA) coupled to the optical receiver IC to convert an optical signal received at a photodiode of the optical receiver IC into an electrical signal, and an equalization circuit coupled to the TIA to apply high frequency gain to the electrical signal; and
a connector housing to at least partially enclose the printed circuit board.

13. The SFP transceiver of claim 12, wherein the optical transmitter IC includes a VCSEL array and the optical receiver IC includes a photodiode array, wherein the connector housing includes an array of lenses corresponding to the array of VCSELs and the array of photodiodes.

14. The SFP transceiver of claim 12, wherein the driver equalizer comprises a feed forward equalizer circuit, and wherein the equalization circuit comprises a continuous time linear equalizer (CTLE) circuit.

15. The SFP transceiver of claim 12, wherein both the optical transmitter IC and the optical receiver IC operate at a frequency higher than their respective rated bandwidths.

16. An optical transmitter device comprising:
a first connection area to connect to a source terminated laser device; a second connection area to connect to a ground terminated laser device;
a signal line coupled to one of the first connection area and the second connection area; and
a driver circuit coupled to the signal line to drive the laser device, including providing an output signal to the signal line, wherein the driver circuit includes a variable current source configured to produce a first current when the signal line is connected to the first connection area to drive the source terminated laser device, or to produce a second current different from the first current when the signal line is connected to the second connection area to drive the ground terminated laser device.

17. The optical transmitter device of claim 16, the driver circuit further comprising an inductor in a signal path of the driver circuit coupled to the signal line, the inductor configured to suppress reflection current.

18. The optical transmitter device of claim 17, the driver circuit further comprising a capacitor in parallel with the variable current source.

19. The optical transmitter device of claim 16, the driver circuit further comprising an equalizer to apply high frequency gain to an optical signal to be transmitted by the laser device.

* * * * *